(12) United States Patent
Goldstein et al.

(10) Patent No.: US 11,206,149 B1
(45) Date of Patent: *Dec. 21, 2021

(54) CO-READING GROUP AD HOC FORUM

(71) Applicant: Amazon Technologies, Inc., Seattle, WA (US)

(72) Inventors: Seth Gershom Goldstein, San Francisco, CA (US); Seth Daniel Micarelli, Bainbridge Island, WA (US); Craig Reeves Brookes, Bainbridge, WA (US); Jennifer Ann Abts, Seattle, WA (US); Christine Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,175

(22) Filed: Jun. 22, 2020

Related U.S. Application Data

(63) Continuation of application No. 15/798,106, filed on Oct. 30, 2017, now Pat. No. 10,728,049.

(51) Int. Cl.
*H04L 12/18* (2006.01)
*H04L 12/58* (2006.01)
(Continued)

(52) U.S. Cl.
CPC ...... *H04L 12/1818* (2013.01); *G06F 16/9566* (2019.01); *G09B 5/02* (2013.01);
(Continued)

(58) Field of Classification Search
CPC . H04L 12/1818; H04L 51/32; G06F 16/9566; G09B 5/02; G09B 5/08; G09B 7/02; G09B 19/00
See application file for complete search history.

(56) References Cited

U.S. PATENT DOCUMENTS

| 8,793,575 B1 | 7/2014 | Lattyak et al. |
| 2009/0094537 A1* | 4/2009 | Alber ............ G06Q 10/10 715/758 |

(Continued)

OTHER PUBLICATIONS

Office Action for U.S. Appl. No. 15/798,106, dated Nov. 27, 2019. Goldstein, "Co-Reading Group Ad Hoc Forum", 15 pages.
(Continued)

*Primary Examiner* — Sm A Rahman
(74) *Attorney, Agent, or Firm* — Lee & Hayes, P.C.

(57) ABSTRACT

Ad hoc forums may be created and updated to enable users to easily share information, collaborate, track reading progress, coordinate events, and/or exchange other information related to reading of a book or other written work. The ad hoc forum may be accessible via a uniform resource locator (URL), which may be provided to users without requiring user registration and without a need for a dedicated reader device. A service provider may receive information from contemporaneous readers to update the forum, such as to update reading progress information, add messages, add comments, add annotations, and/or other add or modify other collaborative information. The service provider may exchange information with user devices of users via communication channels other than the forum, such as via email and/or text messages, as well as dedicated reader devices, while using this information to update the forum.

20 Claims, 9 Drawing Sheets

(51) Int. Cl.
*G06F 16/955* (2019.01)
*G09B 7/02* (2006.01)
*G09B 5/08* (2006.01)
*G09B 5/02* (2006.01)
*G09B 19/00* (2006.01)

(52) U.S. Cl.
CPC ............... *G09B 5/08* (2013.01); *G09B 7/02* (2013.01); *G09B 19/00* (2013.01); *H04L 51/32* (2013.01)

(56) References Cited

U.S. PATENT DOCUMENTS

| | | |
|---|---|---|
| 2012/0036423 A1 | 2/2012 | Haynes, II et al. |
| 2014/0059443 A1 | 2/2014 | Tabe |
| 2014/0223462 A1* | 8/2014 | Aimone ............. H04N 21/4307 725/10 |
| 2015/0135059 A1* | 5/2015 | Liang ...................... G06F 3/147 715/234 |
| 2015/0271557 A1 | 9/2015 | Tabe |
| 2019/0132405 A1 | 5/2019 | Song et al. |

OTHER PUBLICATIONS

Office Action for U.S. Appl. No. 15/798,106, dated Aug. 21, 2019, Goldstein, "Co-Reading Group Ad Hoc Forum", 13 pages.

\* cited by examiner

US 11,206,149 B1

CO-READING GROUP AD HOC FORUM

CROSS REFERENCE TO RELATED APPLICATIONS

This is a continuation application which claims priority to commonly assigned, co-pending U.S. patent application Ser. No. 15/798,106, filed Oct. 30, 2017. Application Ser. No. 15/798,106 is fully incorporated herein by reference.

BACKGROUND

Many people like to read books or other literature during a same span of time as friends, family members, classmates, or other people to enable sharing information, participating in discussions, and/or motivating one another to complete the book. However, connecting with people can be a challenge, especially when individuals use different types of electronic devices and/or some users rely on reading paper books. The problem can be further complicated when some users are located remotely and have limited connectivity to digital devices and/or the internet.

Existing services, such as Goodreads®, allow users to connect with other users that are reading a same book. However, these services often require users to sign up for a service and/or use a dedicated electronic book reader device. Many people do not have dedicated electronic book reader devices, and thus could not participate in some existing services without incurring additional expense. Further, it may be impractical to ask some users, such as students in a same class, to create an account to participate in a discussion. However, most people have at least a telephone number or an email account and likely have at least occasional access to the Internet.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
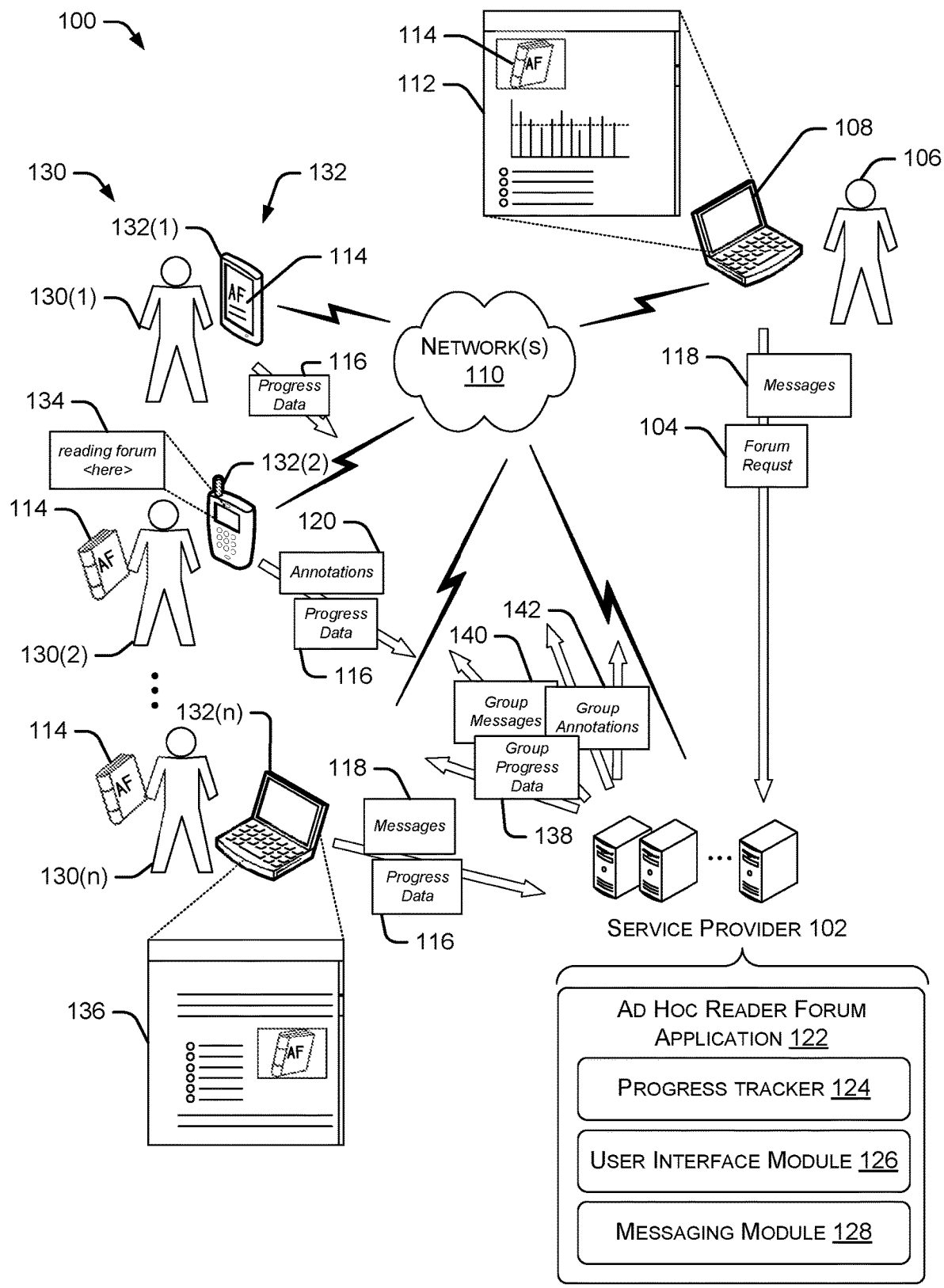
FIG. 1 is a schematic diagram of an illustrative environment to facilitate an ad hoc forum for a co-reading group.

This disclosure is directed to creating forums to enable users to easily share information, collaborate, track reading progress, coordinate events, and/or exchange other information related to reading of a book or other written work. Although the term "book" is used throughout this disclosure, the ad hoc forum may be created around reading of other types of literature, such as plays, poetry, journals, textbooks, and so forth. The forum may be any digital space where users can contribute information that is shared with other users. The forum may be an ad hoc forum, and thus created for a particular book or written work. The forum may be accessibly without an account or use of a special device, possibly by way of access to a uniform resource locator (URL). As used herein, the term "URL" includes any type of identifier of an accessible location from which data may be served to a user device or otherwise obtained by a user device. For example, a URL may include a network address, a file location, or other location information, which may be accessible via text input, a link, an image code (e.g., a quick response (QR) code, etc.), and/or other controls.

The ad hoc forum may be created by an administrator, which may be a teacher, a selected member of a group, or anyone else that desires to create a new ad hoc forum for contemporaneous readers of a book. The administrator may provide a service provider with a title of the book and/or other information to identify the book, possibly by selection of the book from a catalog accessible via the service provider. The selected book may be associated with data about the book, such as page count and other metrics associated with the book. An electronic version of the book ("eBook") may be associated with the selected book and made available for acquisition by users of the ad hoc forum. For example, users may purchase the eBook, or in some instances, share the eBook. The administrator may invite friends, classmates, and/or other people to join the ad hoc forum. In some embodiments, the administrator may input invitee information, such as an electronic mail ("email") address, a telephone number, or other electronic address information to enable communications with devices associated with the invitees. The service provider may then send communications to the invitees, which may provide a link or other resource to enable an invitee to access the ad hoc forum. In various embodiments, the invitees may access a uniform resource locator (URL), which may be generated for the ad hoc forum. The administrator may provide the URL to friends or other people manually (e.g., verbally, by text on printed paper, by email, etc.) and without the service provider. In some embodiments, the URL may be created using a structured naming convention that may be relatively easy to remember, such as a naming structure that includes the name of the administrator, the name of the book, a random word, and/or other information.

An example URL may be "www.adhocforum.com/seth-goldstein/eastofeden/balloon", which may be easily communicated to invitees by a text message, an email, verbally, or by other distribution techniques.

An invitee may access the ad hoc forum, possibly via the URL as discussed above. The invitee may input identification information, such as at least some of the person's contact information, a special code provided with the invitation, and/or other information to identify the invitee. This information may be used to create a home page for the user which is unique to that user. However, in some embodiments, all users may access a same page, which may be structured in a similar manner as described below. The invitee may select or specify one or more preferences, such as how to provide reading progress updates to the service provider, which are represented on the ad hoc forum to track progress of contemporaneous readers in the group. Other preferences may be how to receive updates, messages, reminders, and/or other information. In some embodiments, users may receive communications outside of the ad hoc forum using text messages, email, a dedicated device, and/or other communication devices with corresponding electronic addresses. Similar communication techniques may be used to provide reading updates to the service provider. For example, a user may read a paper version of a book. At the end of a reading session, the user may send a message to the service provider to indicate the user's reading progress, such as a page number, chapter, or other progress information. The user may send a text message, email, or other communication to the service provider to provide this information. In some embodiments, the user may send a photo of a page of the book, which may be analyzed by the service provider to determine a location (e.g., page or location in the book), which may be used to determine reading progress of the user. Photos may also be used to communication other information, such as annotations, which are described below.

From time to time, users may access the ad hoc forum to track progress of the group, post messages, determine upcoming events, create a challenge for other users, and/or otherwise interact in a collaborative space centered on the particular book. Upon completion of the book, the users may start a new ad hoc forum for another book. The ad hoc forum may include a message center, which may include goals, events, messages. In some embodiments, this may be specific to a user when the ad hoc forum enables users to "login" to user pages for the ad hoc forum. When no "user pages" are used or available, then users may all view the same page. The ad hoc forum may include one or more reports that provide information about reading progress of the group. As an example, the reading progress may be determined by self-reporting by individuals, by automatic reporting by some dedicated reader devices, and/or by other means, to provide a graphic that charts reader's progress. The ad hoc forum may include a message feed, which may enable users to post questions, thoughts, and/or other writings in a feed format, which may be organized by chronology, by user, by progress in the book, or in other ways. The ad hoc forum may enable users to access annotations created during reading of the book. Annotations may be created using dedicated reader devices, by associating a comment with a portion of the book, by highlighting text in the book, and/or by associating other information as metadata with a portion of the book. An annotation graphic may be provided by the ad hoc forum to enable users to view annotation via the ad hoc forum and without need for a dedicated reader device. In some embodiments, a user may create an annotation by capturing a photo of a page of a book and submitting the photo possibly with other information or comments to the service provider for publication in the ad hoc forum as an annotation. The ad hoc forum may also include tools, such as controls to enable inviting other people to access the ad hoc forum, links to a digital version of the book (e.g., eBook), links to book reader software, and/or other tools.

The service provider may provide the ad hoc forum to users to enable contemporaneous readers of a book to collaborate without restrictions used by other services, such as by requiring users to have certain dedicated reader devices, accounts, and/or other device or information restrictions. The service provider may exchange information with users based on preferred communication types, which may include use of text messages, email, input on a forum, or via a dedicated reader device. As discussed herein, dedicated reader devices may include electronic book readers and/or applications to read electronic books (eBooks). Text messages may include short message service (SMS) messages, multimedia messaging service (MMS) messages, instant messages, and/or other types of messages associated with a user device or user account. By using different devices, the service provider employs technical solutions to route information to users, capture information from users, and process the information to extract meaningful information for the ad hoc forum, such as reading progress information, annotations, messages, and/or other information to enable contemporaneous reader collaboration.

The techniques and systems described herein may be implemented in a number of ways. Example implementations are provided below with reference to the following figures.

FIG. 1 is a schematic diagram of an illustrative environment 100 to facilitate an ad hoc forum for a co-reading group. The environment includes a service provider 102. The service provider 102 may include one or more computing devices, or possibly virtual instances or other cloud computing architecture, to create ad hoc forums, provide the ad hoc forums to users, and update the ad hoc forums based on information received from devices associated with users.

The service provider 102 may receive a request 104 from an administrator 106 associated with a first device 108, via one or more networks 110. The networks may be wired networks, wireless networks, or a combination of both. The request 104 may be generated using a first user interface 112 provided to the first device 108 by the service provider 102. The request 104 may include a designation of a book 114. As used herein, the term "book" includes any written works, such as journals, plays, poems, and/or other written works. In some embodiments, the request may include invitees to be invited to access the ad hoc forum.

In response to receiving the request and possibly other information, the service provider 102 may create the ad hoc forum to enable users to collaborate and share information associated with the book 114. The ad hoc forum may be made accessible to invitees via a URL. In various embodiments, the service provider 102 may transmit messages to invitees to provide the URL to the invitees. Invitees may access the ad hoc forum. Some users may interact directly with the ad hoc forum via the URL while other users may transmit information to the ad hoc forum by other communication means such as by text messaging, email, sending photos, and/or using a dedicated reader device that is registered with the service provider. For example, the aforementioned communication means may provide reading progress data 116 to the service provider 102, and possibly other information such as messages 118, annotations 120, questions, and/or other information.

The service provider 102 may include an ad hoc reader forum application 122 (or "application 122"). The application 122 may include various modules such as a progress tracker 124, a user interface (UI) module 126, and a messaging module 128, among other possible modules discussed below, which may exchange data with various users 130 via user devices 132. The application 122 and modules are discussed in further detail in the discussion that follows, and later with reference to FIG. 2.

A first user 130(1) may be associated with a first user device 132(1). The first user device 132(1) may be a dedicated book reader device capable of displaying an eBook for reading by the first user 130(1). The first user 130(1) may configure the first user device 132(1) to communicate with the service provider, such as by providing information to the service provider via the URL during a registration process. The service provider 102, via the progress tracker 124, may automatically, from time to time, receive the progress data 116 from the first user device. The progress data 116 may indicate a reading location (e.g., page number or other location identifier) of the first user 130(1).

A second user 130(2) may be associated with a second user device 132(2). The second user device 132(2) may be a mobile telephone. The second user 130(2) may read a physical paper copy of the book 114. The second user 130(2) may exchange information with the service provider 102, from time to time, using the second user device 132(2), such as by sending and receiving text messages, emails, and/or other communications. As an example, the second user 130(1) may transmit at least some of the progress data 116 for that user via text messages, such as by manually texting, from time to time, a page number last completed by the second user. The service provider 102 may provide a link to the user to access the URL via a user interface 134. The service provider may provide the second user prompts, request for progress data, and/or other information with text message updates or other information communicated to the second user device 132(2).

A third user 130(n) may be associated with a third user device 132(n). The third user device 132(n) may be a conventional computing device (e.g., a laptop computer, a tablet computer, etc.). The third user 130(n) may read a physical paper copy of the book 114. The third user 130(n) may exchange information with the service provider 102, from time to time, using the third user device 132(n) to update the ad hoc forum directly via manual inputs to the URL. As an example, the third user 130(1) may manually enter, from time to time, a page number last completed by the third user via input fields on the ad hoc forum. The service provider 102 may provide information to the third user via the ad hoc forum via a user interface 136. The user interface 136 may be a same user interface as viewable by all the users 130 or may be a customized user interface for the third user 130(n), in accordance with some embodiments. The service provider may provide the second user prompts, request for progress data, and/or other information via the ad hoc forum via a user interface 136.

The progress tracker 124 may aggregate the progress data 116 received from the user devices 132. In some embodiments, the progress tracker 124 may solicit progress data from users 130 via the user devices 132, possibly by email or text message. The progress tracker 124 may include completion goals and possibly intermediate goals to keep readers on track to complete the book 114 around a same general time (e.g., plus or minus days or weeks). The progress tracker 124 may transmit group progress data 138 to the user devices 132.

The user interface module 126 may provide the ad hoc forum to the users, such as the interface 136. The user interface module 126 may provide graphics, input fields, and/or other tools to enable user to collaborate while reading the book 114. The user interface module 126 may enable users to post messages to the ad hoc forum to all users and/or to select users and/or create annotations. In some embodiments, annotations may be created by dedicated reader devices, such as the first device 132(1). However, as discussed herein, other users may create annotations by associating text in the book with metadata. The user interface module 126 may enable access to group messages 140 and/or group annotations 142 for consumption by the users 130.

The messaging module 128 may enable users to communicate with the service provider using the ad hoc forum (via a URL), via exchange of text messages (e.g., SMS, MMS, instant messages, etc.), by email, by dedicated reader devices, and/or by other communication means. For example, the message module 128 may determine a communication type preference for a user based on input by the user. The messaging module 128 may enable users that do not have the dedicated reader device (e.g., the first user device 132(1)) to participate in the ad hoc forum using other tools made available by the application 122.

Figure 2:
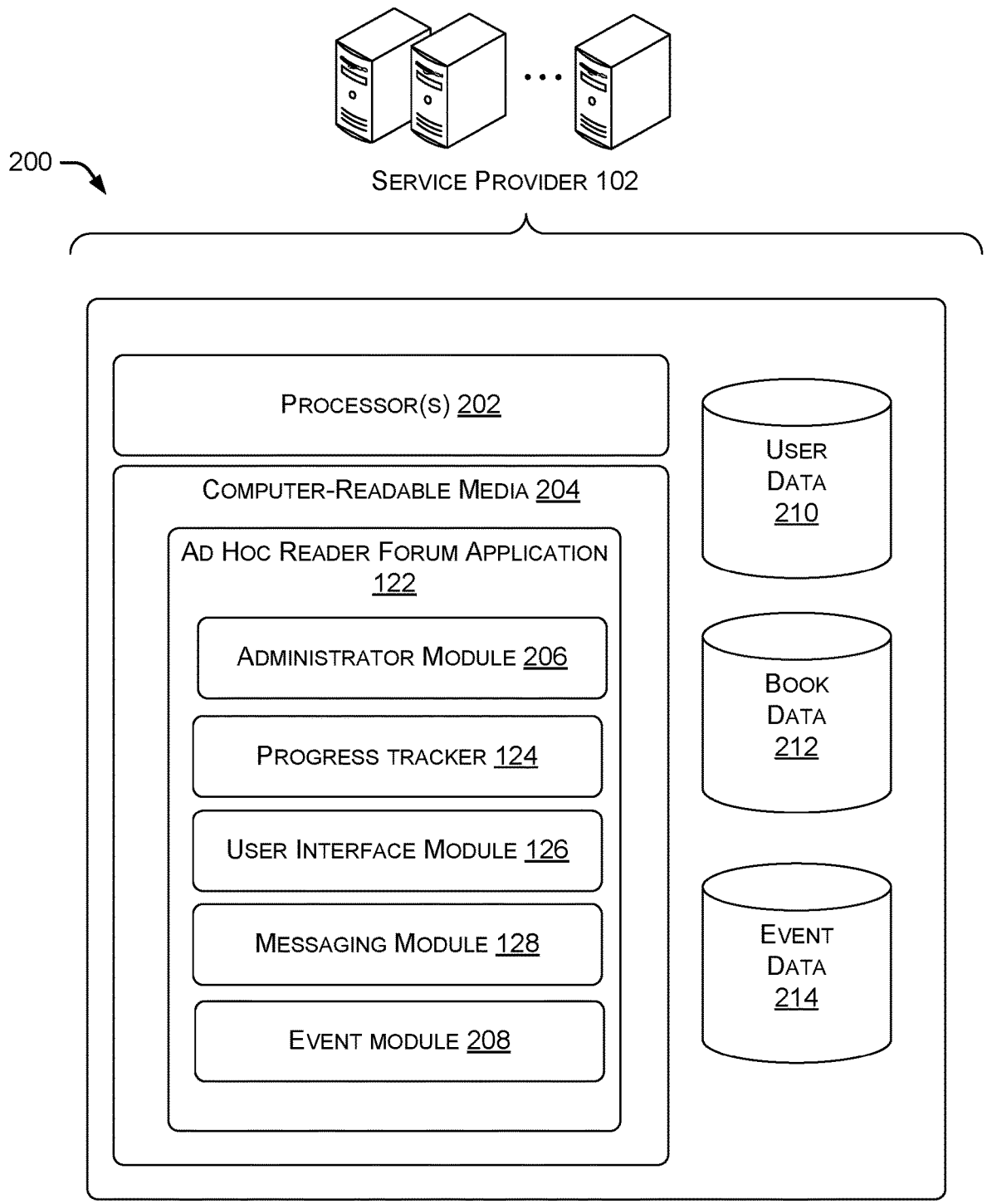
FIG. 2 is a block diagram of illustrative computing architecture shown in FIG. 1.

FIG. 2 is a block diagram of illustrative computing architecture 200 of the service provider 102 shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store an administrator module 206, the progress tracker 124, the UI module 126, the messaging module 128, and an event module 208. In some embodiments, the architecture may include or access at least user data 210, book data 212, and/or event data 214. The various modules, components, and data stores are described below, and may be stored together or in a distributed arrangement.

The administrator module 206 may allow a user, such as a designated administrator, teacher, or other user to create an new ad hoc forum for a book to enable collaboration with a new set of users that intend to read the book. The ad hoc forum is intended to enable collaboration as the book is read, and is not intended for reuse after completion of the book. In some embodiments, the administrator module 206 may remove or delete the ad hoc forum after the book is completed. The administrator module 206 may enable associating the ad hoc forum with a book, possibly by searching for the book via book data 212. The book data may include a catalog of books and related metadata, such as organization of books, page count, chapter information, author information, and other relevant book information. The administrator module 206 may receive invitees and contact information of the invitees, which may be store in user data 210. The user data may include contact information, and may be safeguarded against unauthorized use or access. In some instances, the user information may be obtained directly from users that access the ad hoc forum, such as users the set up a communication with the service provider 102 for messages, progress tracking, and so forth. The administrator module 206 may also enable creation of goals, a timeline, user interface features, and/or other information to be used by the ad hoc forum.

The progress tracker 124 may aggregate progress data received by the user devices associated with users of the ad hoc forum. In some embodiments, the progress tracker 124 may solicit progress data from users via the user devices, possibly by email or text message. The progress tracker 124 may use completion goals and possibly intermediate goals received via the administration module 206 to keep readers on track to complete the book around a same general time (e.g., plus or minus days or weeks). The progress tracker 124 may transmit group progress data to the user devices, such as by posting progress via the UI module on the ad hoc forum, by email, by text message, and/or by other communication means.

The user interface (UI) module 126 may provide the ad hoc forum to the users via a URL. The user interface module 126 may provide graphics, input fields, and/or other tools to enable user to collaborate while reading the book. For example, the UI module 126 may include an announcement portion that includes goals, upcoming events, and possibly messages for users. The UI module 126 may include a progress graphic that includes information on reading progress for the users of the ad hoc forum. The progress graphic may use data captured by the progress tracker 124. The UI module 126 may include a message feed portion that includes messages, questions, and/or other text-based information from users. In some embodiments, this information may be sorted and/or filtered to enable easy access to information, avoid "spoiling" the book, and so forth. The message feed may be updated in part using information from the message module 128. The UI module 126 may include an annotation section to enable users to view annotations via the ad hoc forum. The UI module 126 may include tools, controls, and/or other information to enable users to obtain an electronic version of the book, to obtain an book reader application, to obtain invite other users to join, and/or to provide other functionality related to collaboration.

The messaging module 128 may enable users to communicate with the service provider using the ad hoc forum (via a URL), via exchange of text messages (e.g., SMS, MMS, instant messages, etc.), by email, by dedicated reader devices, and/or by other communication means. For example, the message module 128 may determine a communication type preference for a user based on input by the user. For example, a first user may prefer to receive updates by text message and provide reading progress by text messages. A second user may prefer to use a dedicated reader device and may authorize the service provider 102 to use the messaging module 128 to communicate with the user's dedicated reader device. A third user may prefer to exchange information by email, and a fourth user may prefer to use the ad hoc forum, via the URL to manually enter information, such as reading progress updates, messages, and so forth. In some embodiments, the messaging module 128 may receive photos of a page of a book from user devices, which may be analyzed to determine a location of the text shown in the photo. This information may be used by the progress tracker 124 and/or may be used to associated text with an annotation, among other possible uses. The messaging module 128 may enable users that do not have the dedicated reader device (e.g., the first user device 132(1)) to participate in the ad hoc forum using other tools made available by the application 122.

The event module 208 may enable creation of events that are triggered at least in part based on reading progress of users participating in the ad hoc forum. For example, an administrator may create an event that is associated with a page or location in the book. Upon or after reaching that location, the service provider may execute the event. For example, the event module 208 may include an event that asks a question about a chapter to users that have completed the chapter. The event module 208 may generate challenges to keep readers on pace with their reading progress. For example, if a user falls behind in reading, the event module 208 may provide goals to help the reader catch up to the group. As an example, if the group reads 20 pages a day on average, and a user is behind by 20 pages from the group, the event module 208 may generate a message for sending to the user to challenge the user to read an extra 10 pages for the next two days to catch up to the group. The event module 208 may store and/or access event data 214, which may include algorithms and/or other data discussed above. Algorithms may be used to create progress challenges, such as the challenge example above that increases a user's reading goals.

Figure 3:
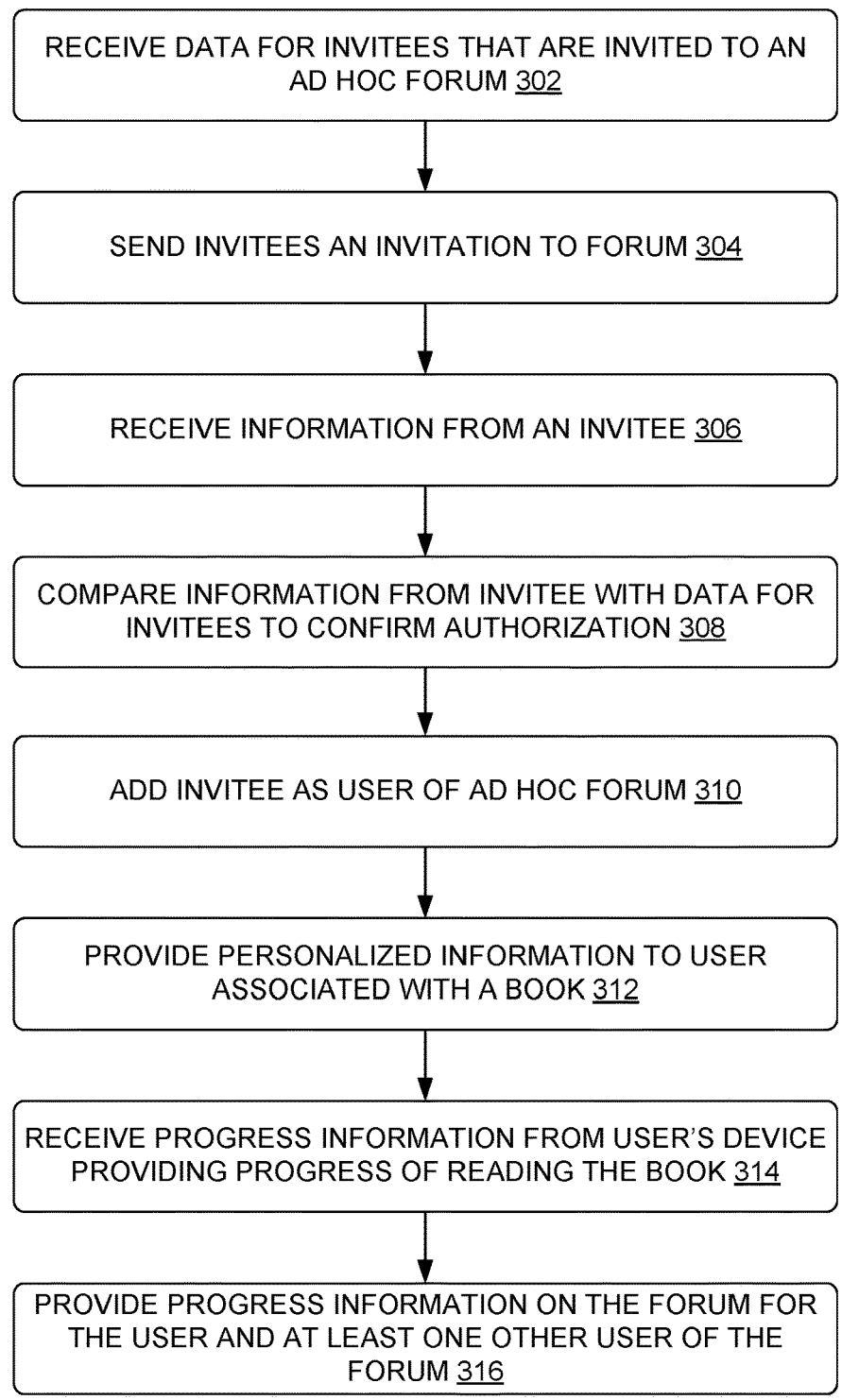
FIG. 3 is a flow diagram of an illustrative process to create and exchange data to maintain an ad hoc forum for a co-reading group.

FIG. 3 is a flow diagram of an illustrative process 300 to create and exchange data to maintain an ad hoc forum for a co-reading group. The process 300 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 300 is described with reference to the environment 100 and the computing architecture 200. Of course, the process 300 may be performed in other similar and/or different environments.

At 302, the application 122 may receive data for invitees that are invited to an ad hoc forum provided by the service provider 102 and focused on collaboration for a particular selected book. For example, an administrator may provide contact information for invitees that may access the ad hoc forum. The information may be provided in fields provided in an intake form that enables creation of a new ad hoc forum.

At 304, the messaging module 128 may transmit invitations to the invitees using at least some of the information obtained at the operation 302. However, in some embodiments, the invitees may receive the invitation verbally or by other communications directly from the administrator, especially when the URL of the ad hoc forum is relatively short and easy to type or remember.

At 306, the user interface module 126 may receive information from an invitee that first access the ad hoc forum. For example, an invitee may access a URL and provide at least some information to the service provider, such as a preferred communication type, a password, and/or other identification information. However, in some embodiments, the user interface module 126 may not provide personalized information, and thus no input may be required by the user for identification purposes.

At 308, when the user inputs information via the operation 306, the application 122 may compare the information from the invitee with data for the invitees from the operation 302 to confirm authorization to access and use the ad hoc forum.

At 310, the application may add the invitee as a user of the ad hoc forum. In some embodiments, adding the user may include creating a URL for the user that is associated with the ad hoc forum to enable the user to receive personalized information via the URL. In various embodiments, the user may view a shared URL, but may provide information to the service provider to enable tracking reading progress, sharing messages, and/or enabling other functionality and collaboration via the URL. For example, the ad hoc forum may configure a process to determine the user's reading progress via text messages, emails, communications with a dedicated reader device, and/or via other communication means.

At 312, the messaging module 128 may provide personalized information to the user associated with the book. The personalized information may be provided by the user interface module 126 via the ad hoc forum, or may be provided via other interfaces or communication techniques discussed herein. For example, the personalized information may be sent by text message to a device associated with the user.

At 314, the progress tracker 124 may receive progress information from the user's device that provides progress of reading of the book. The progress information may be provided by text message, by email, by manual entry via the URL, by automatic updates via a dedicated reader device, and/or by submission of a photo of a page of the book. In some embodiments, the messaging module 128 may transmit a request to the user device of a user to request entry of a reading progress or location, such as at the end of each day or from time to time.

At 316, the progress tracker 124 may provide progress information on the ad hoc forum for the user and at least one other user of the ad hoc forum. In some embodiments, the progress tracker 124 may show progress of all users that have reported progress within a predetermined amount of time or having any reported progress. The progress tracker 124 may show goals, average reading location, and/or other metrics for the user and/or for the group of users that collaborate via the ad hoc forum.

Figure 4:
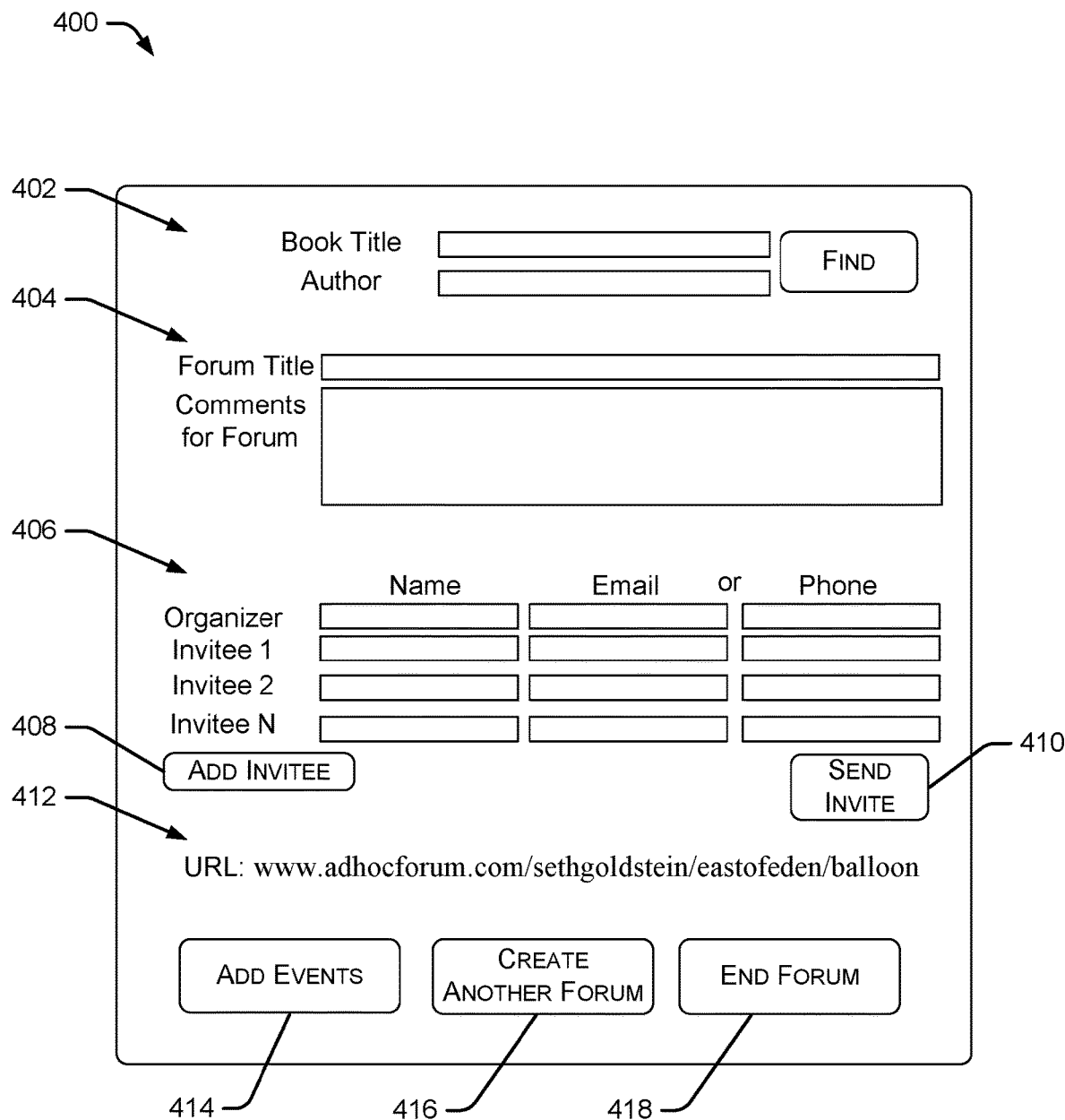
FIG. 4 is an illustrative user interface (UI) configured to receive information to create an ad hoc forum for a co-reading group.

FIG. 4 is an illustrative user interface (UI) 400 configured to receive information to create an ad hoc forum for a co-reading group. The UI 400 provides example information, which may be created and/or distributed to user devices in part and/or with other user interface information discussed herein.

A first portion 402 of the UI 400 may include one or more fields or controls to enable selection of a book (or other written work) for association with a new ad hoc forum. An administrator may input information about a book to enable selection of the book from a catalog or other storage repository. By selecting a book, the book may be associated with metadata that includes page count, chapter information, and/or other data.

A second portion 404 of the UI 400 may include one or more fields to input a title, comments, instructions, and/or other messages for the ad hoc forum. For example, the administrator may use a comment field to provide instructions for the group, a timeline, a syllabus, and/or other information to help organize the collaboration of the group of readers.

At third portion 406 of the UI 400 may include one or more fields to input invitee information, such as a name, an email and/or a telephone number for each invitee. Additional invitees may be added using an "add invitee" control 408. Invitations to join the ad hoc forum may be sent using a "send invite" control 410. The service provider 102, via the messaging module 128, may transmit messages via email, text message, and/or other communication means to the invitees to invite them to access the ad hoc forum. The invitation may include a URL 412. In some embodiments, the URL 412 may be created using a structured naming convention that may be relatively easy to remember, such as a naming structure that includes the name of the administrator, the name of the book, a random word, and/or other information. An example URL follows: "www.adhocforum.com/sethgoldstein/eastofeden/balloon", which may be easily communicated to invitees by a text message, an email, verbally, or by other distribution techniques. In some embodiments, the administrator may provide the URL to friends or other people manually and without the service provider 102.

The UI 400 may include various controls to access additional functionality of the service provider. An "add events" control 414 may enable the administrator to add events for execution by the event module 208. A "create another forum" control 416 may create a new ad hoc forum for a different book or written work. A "end forum" control 418 may remove a forum that is no longer active or where the group has completed the book and concluded collaboration. Other controls may also be presented to facilitate collaboration between readers of the book.

In some embodiments, the service provider 102 may generate the forum without user input or with fewer inputs than shown in FIG. 4. For example, the application 122 may enable a user to create a forum for a book or other written work from a menu or option associated with the book or written work. In some embodiments, the application 122 may suggest or offer to create a forum for a particular book. Selection of the offer may enable user access to the forum, which may be a newly created forum that the user can then share with our friends and/or other readers. Thus, the forum creation may be performed with fewer inputs than those shown in FIG. 4.

Figure 5:
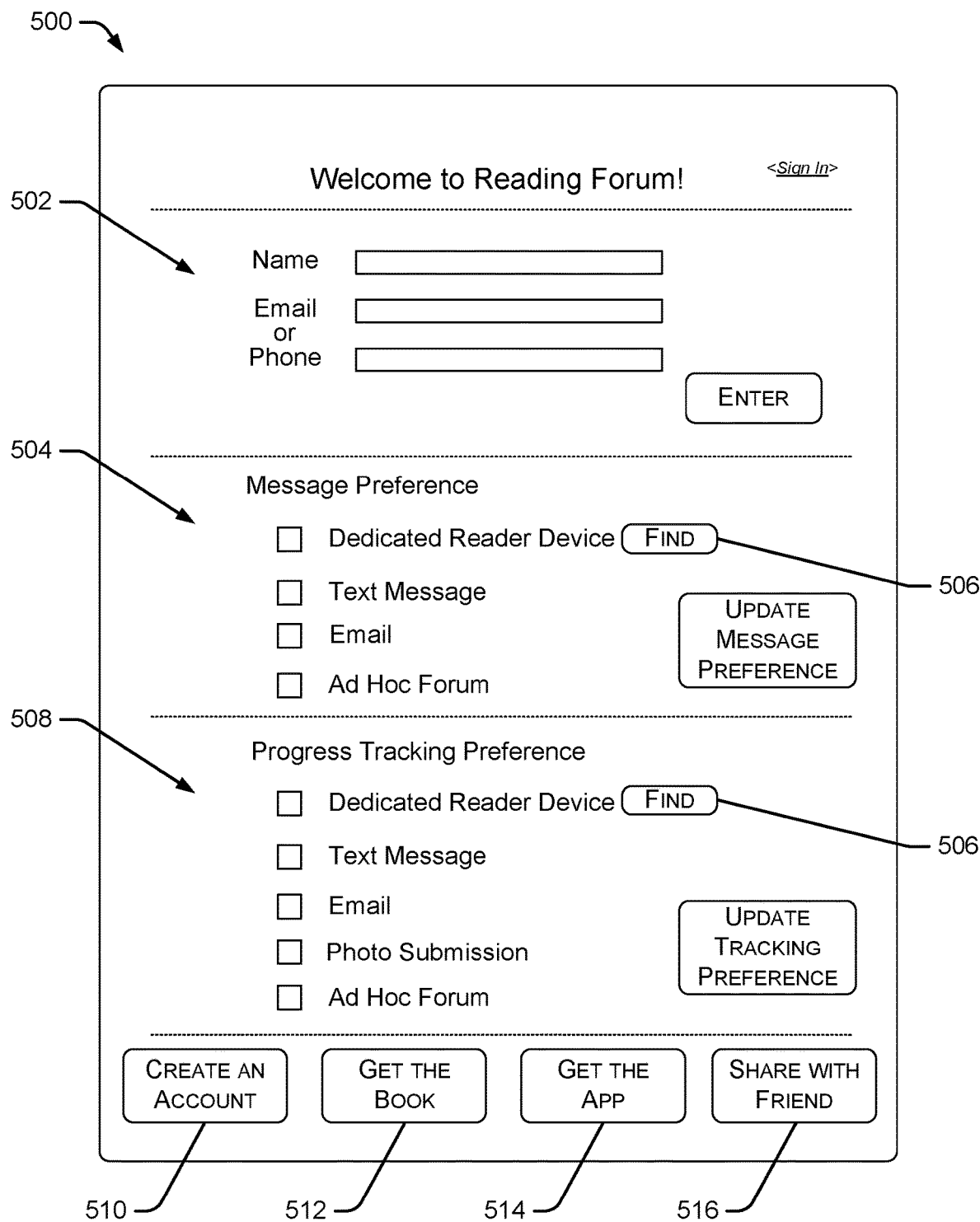
FIG. 5 is an illustrative UI configured to receive an invitee as a new user.

FIG. 5 is an illustrative UI 500 configured to receive an invitee as a new user. The UI 500 provides example information, which may be created and/or distributed to user devices in part and/or with other user interface information discussed herein.

A first portion 502 of the UI 500 may include one or more fields to input a name and contact information for the invitee. This information may be used to verify an identify of the user and/or to allow the user to access customized information for the user. In some embodiments, the information obtained in the first portion 502 may be used to enable selection of other preferences using the UI 500.

A second portion 504 may enable selection of a communication type or types for providing messages and notifications to the user and/or receiving messages and/or notifications from the user, via the messaging module 128 and/or other communication components. In some embodiments, the second portion 504 may include a "dedicated reader device" option to enable the user to exchange information with the service provider using a dedicated reader device, such as a Kindle® electronic book reader device or other dedicated book reader device. A "find" control 506 may enable input of information to find a dedicated device associated with the user. The second portion 504 may also include other options for communication types, such as by text message (e.g., SMS, MIMS, instant message, etc.), by email, and/or by manual entry via the ad hoc forum, as described with reference to FIG. 6.

A third portion 508 may enable selection of a communication type or types for providing tracking progress via the progress tracker 124 and/or the messaging module 128. The third portion 508 may include options of one or more of using the dedicated reader device, text message submissions, email submissions, photo submissions, and/or input via the ad hoc forum. The photo submissions may enable a user to submit a photo of a page of the book that captures text in the book and/or a page number in the book. The photo may be sent to the service provider 102 via an MIMS message, email, or other communication channel. The progress tracker 124 may analyze the photo to determine a reading location associated with text captured in the photo.

The UI 500 may include various controls to access additional functionality of the service provider 102. A "create an account" control 510 may enable the user to create an account, which may enable the user to save preferences and/or access other features. A "get the book" control 512 may access the book via an electronic marketplace or download location. In some embodiments, the book may be available for free, for borrowing, and/or for sale. The "get the book" control 512 may access one or more different versions of the book and/or one or more different offerings. A "get the app" control 514 may access a downloadable application which may be used to read the book and/or access the ad hoc forum. For example, the downloadable application may enable using a device, such as a smart phone, tablet computer, or notebook computer to operate as a dedicated reader device. A "share with a friend" control 516 may provide an invitation to join the ad hoc forum to another invitee. Other controls may also be presented to facilitate collaboration between readers of the book.

Figure 6:
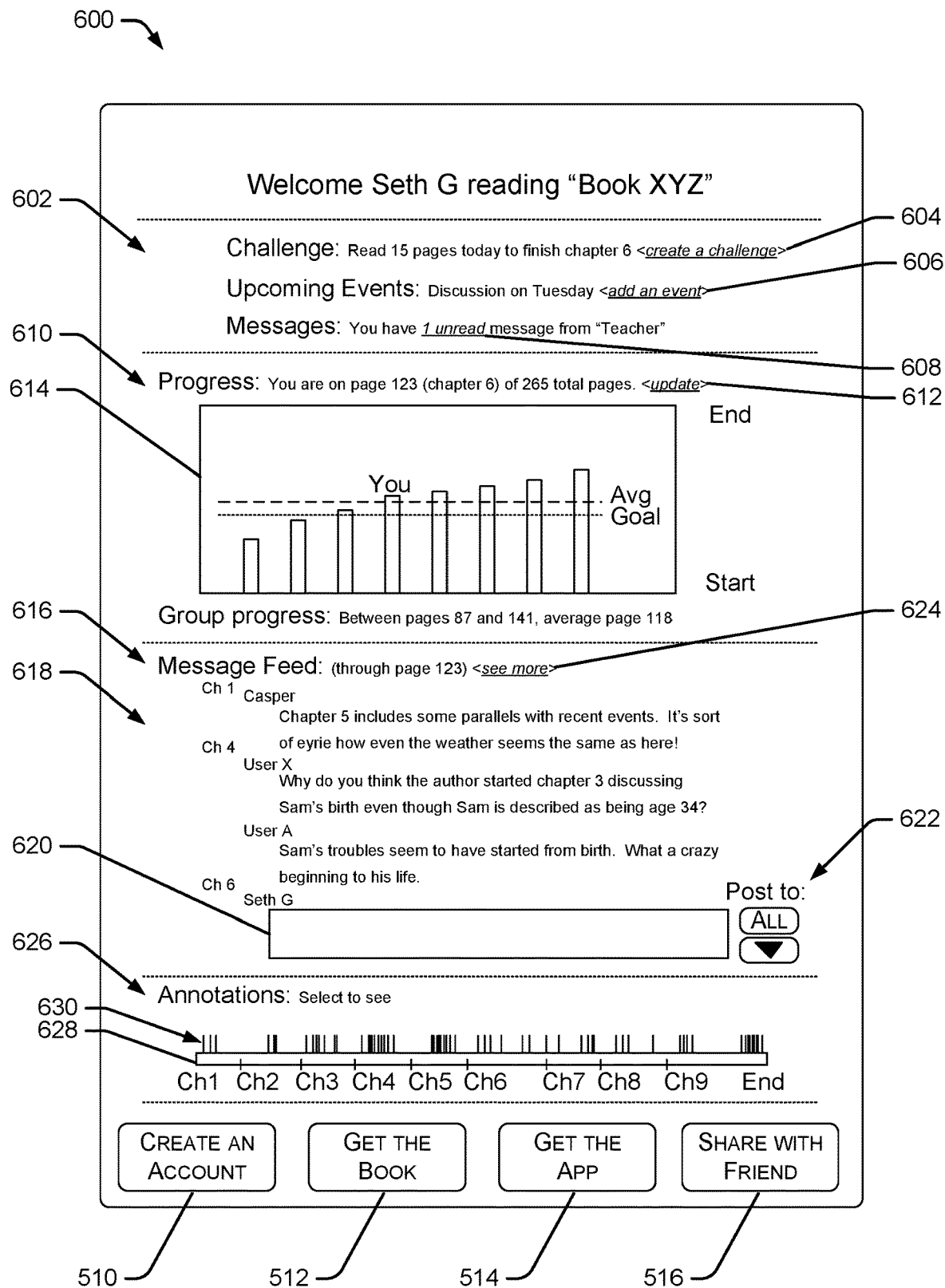
FIG. 6 is an illustrative UI configured as a collaboration forum for a user.

FIG. 6 is an illustrative UI 600 configured as a collaboration forum for a user. The UI 600 provides example information, which may be created and/or distributed to user devices in part and/or with other user interface information discussed herein. As shown in FIG. 6, the UI 600 may be personalized for a particular user, which may be implemented using cookies and/or using a URL extension for the user, such as an example URL that is unique for a user "user-abc": www.adhocforum.com/sethgoldstein/eastofeden/balloon/user-abc," where "user-abc" is the name of the user accessing the personalized information. Of course, the URL may be password protected and/or include additional security if desired. However, since the nature of the ad hoc forum is collaboration, security is not likely a concern. However, the UI 600 may be generic and may be shared by all users, and thus not personalized for a specific user.

Figure 7:
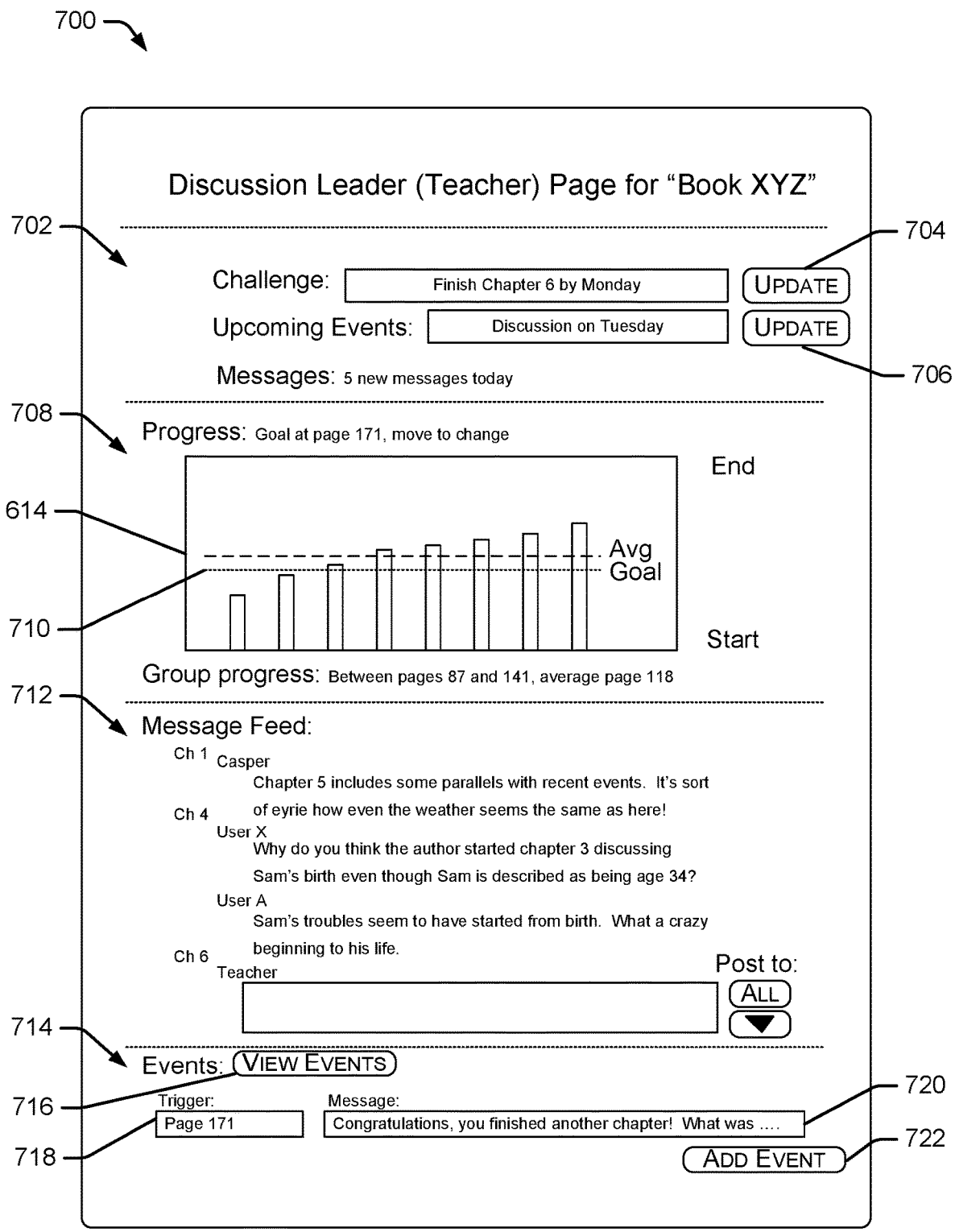
FIG. 7 is an illustrative UI configured to receive an administrative user.

A first portion 602 of the UI 600 may include one or more pieces of information, possibly based on inputs by the administrator. The information may include a challenge, such as a goal for the group and/or personalized goals for users. A "challenge" control 604 may enable a user to create a new challenge, modify the challenge, respond to the challenge, and/or provide other input in response to the challenge. The information may include a notice of one or more upcoming events, such as a deadline to complete a milestone in the book, a date of a discussion, a date of a test, and/or other events. An "add an event" control 606 may enable a user to add a new event. Events may be added by an administrator as shown in FIG. 7, but may not be limited to creation by the administrator. The information may include messages. The messages may indicate new messages for that day, since a last visit, or for other periods of time. A "view message" control 608 may provide access to recent messages, such as the messages indicated as unread or as new within a period of time.

A second portion 610 of the UI 600 may include information pertaining to reading progress for users in the reading group. The second portion 610 may include information specific to a user and/or may include a "update" control 612 to enable a user to input progress manually, such as to type in a page location or another reading progress indicator. A reading progress graphic 614 may provide reading progress for users in the reading group. In some embodiments, the reading progress graphic 614 may providing additional information, such as a goal which moves over time based on input from the administrator (e.g., input of a syllabus, a timeline, etc.), information about the group's performance, and so forth. The reading progress graphic 614 may be updated by the progress tracking in response to receipt of new progress information from users and/or from time to time (e.g., daily, hourly, randomly, etc.). Although the reading progress graphic 614 is shown as a bar graph indicating reading progress between a start and end of the book, other graphics or numerical data may be used to convey the same or similar information.

A third portion 616 of the UI 600 may include information pertaining to messages shared between the users to create collaboration. The third portion may include a message feed 618, which may enable users to post questions, thoughts, and/or other writings. Users may create messages using an input field 620, which may enable creation of messages for all or for selected users, using respective controls 622. In some embodiments, the messages may be organized by chronology, by chapter, by user, by progress in the book, or other groupings.

In various embodiments, at least some messages may be suppressed from view, but accessible via a "see more" control 624. For example, messages that may spoil content that is unread by some users may be suppressed from view, but accessible using the "see more" control 624. As readers continue reading progress, content that was suppressed may become unsuppressed and made visible in the third portion 616 without accessing the "see more" control 624. As an example, if a reader (user) is reading chapter 5 and posts a question, that question may be located near other messages associated with chapter 5 or near other messages drafted by users that were reading chapter 5 at the time of their posts. By organizing posts by reading progress, users may read posts without spoiling the book. When users view user pages created for individual users, the user page may filter messages by reading progress to omit showing a message pertaining to a section of the book that is currently unread by the user of the user page. Thus, messages may be tagged with a reader's reading progress (e.g., created when user ABC was on page 76, etc.), which may be used to sort the messages, filter the messages, and/or may be used for other reasons. In some embodiments, an author of a message may associate a chapter or other reading location with the message, which may be used to suppress the message as discussed above.

A four portion 626 of the UI 600 may include information pertaining to annotations created by users reading the book. Annotations may be created using annotation tools commonly available with dedicated reader devices, such as highlight annotations, comment annotations, and/or other metadata associated with a location in the book. As discussed herein, annotations may be created by manual input and/or by capturing a photograph of text in the book (sent to the service provider) and providing information in association with the photo to create associated metadata (e.g., text, highlights, etc.). Annotations may be graphically depicted in the UI 600 via a graph 628. Individual annotations may be depicted, and may be selectable for viewing, via annotation tick marks 630 plotted with respect to the graph 628. Thus, the graph 628, combined with the annotation tick marks 630, may provide a visual indications of areas with annotations or a high concentration of annotations. As an example, a user may select the graph 628 to access individual annotations and/or a collection of annotations (e.g., text, highlights, and/or other annotations), or may select annotations tick marks to access individual annotations and/or a collection of annotations, possibly via a different interface.

The UI 600 may include various controls to access additional functionality of the service provider 102. The controls may include the "create an account" control 510, the "get the book" control 512, the "get the app" control 514, and/or the "share with a friend" control 516 as described above with reference to FIG. 5. Other controls may also be presented to facilitate collaboration between readers of the book.

FIG. 7 is an illustrative UI 700 configured to receive an administrative user. The UI 700 provides example information, which may be created and/or distributed to user devices in part and/or with other user interface information discussed herein.

As shown in FIG. 7, the UI 700 may be created for an administrator, teacher, or other person tasked with creating information for the collaboration of readers. However, similar functionality may be performed using the controls described in the above discussed user interfaces, such as UI 600. When used, the UI 700 may be accessible via a URL extension, such as an example URL www.adhocforum.com/sethgoldstein/eastofeden/balloon/admin". Of course, the URL may be password protected and/or include additional security if desired. However, since the nature of the ad hoc forum is collaboration, security is not likely a concern.

A first portion 702 of the UI 700 may include one or more pieces of information updated based on inputs by the administrator and possibly other users. The information may include a challenge, such as a goal for the group and/or personalized goals for users. A "challenge" field 704 may enable an administrator to create a new challenge and/or modify the challenge. The information may include a notice of one or more upcoming events, such as a deadline to complete a milestone in the book, a date of a discussion, a date of a test, and/or other events. An "add an event" field 706 may enable the administrator to add a new event. The information may include messages. The messages may indicate new messages for that day, since a last visit, or for other periods of time.

A second portion 708 of the UI 700 may include information pertaining to reading progress for users in the reading group. The second portion 708 of the UI 700 may be similar to the second portion 610 of the UI 600 shown in FIG. 6. However, the second portion 708 may include a "reading goal" control 710 to enable changing of reading goal, which may be depicted in the reading progress graphic 614.

A third portion 712 of the UI 700 may include information pertaining to messages shared between the users to create collaboration. The third portion 712 may be the same as the third portion 616 of the UI 600 shown in FIG. 6, except the comment field may be labeled for the administrator (e.g., a teacher, etc.).

A four portion 714 of the UI 700 may include information pertaining to events, which can be viewed using a "view events" control 716 and created using fields described next. A trigger field 718 may enable input of a condition to trigger appearance of a message. A message field 720 may include the message. As an example, a message may include a question that the administrator wants to pose to users when the user each reach a certain point in the book, based on progress information captured by the progress tracker 124. For example, the trigger may be a page number, an end of a chapter, a date/time, and/or another event. The message may be a question, an accolade, an encouragement, a tip, and/or other messages, graphics, images, promotions, and so forth. An "add event" control may cause the event module 208 to receive the event and later execute the event as user initiate the trigger. In some embodiments, the messages associated with events may be sent to users via the messaging module 128, such as sent to a user's telephone via text message, sent to a user's email, and/or sent according to other user preferences.

Figure 8:
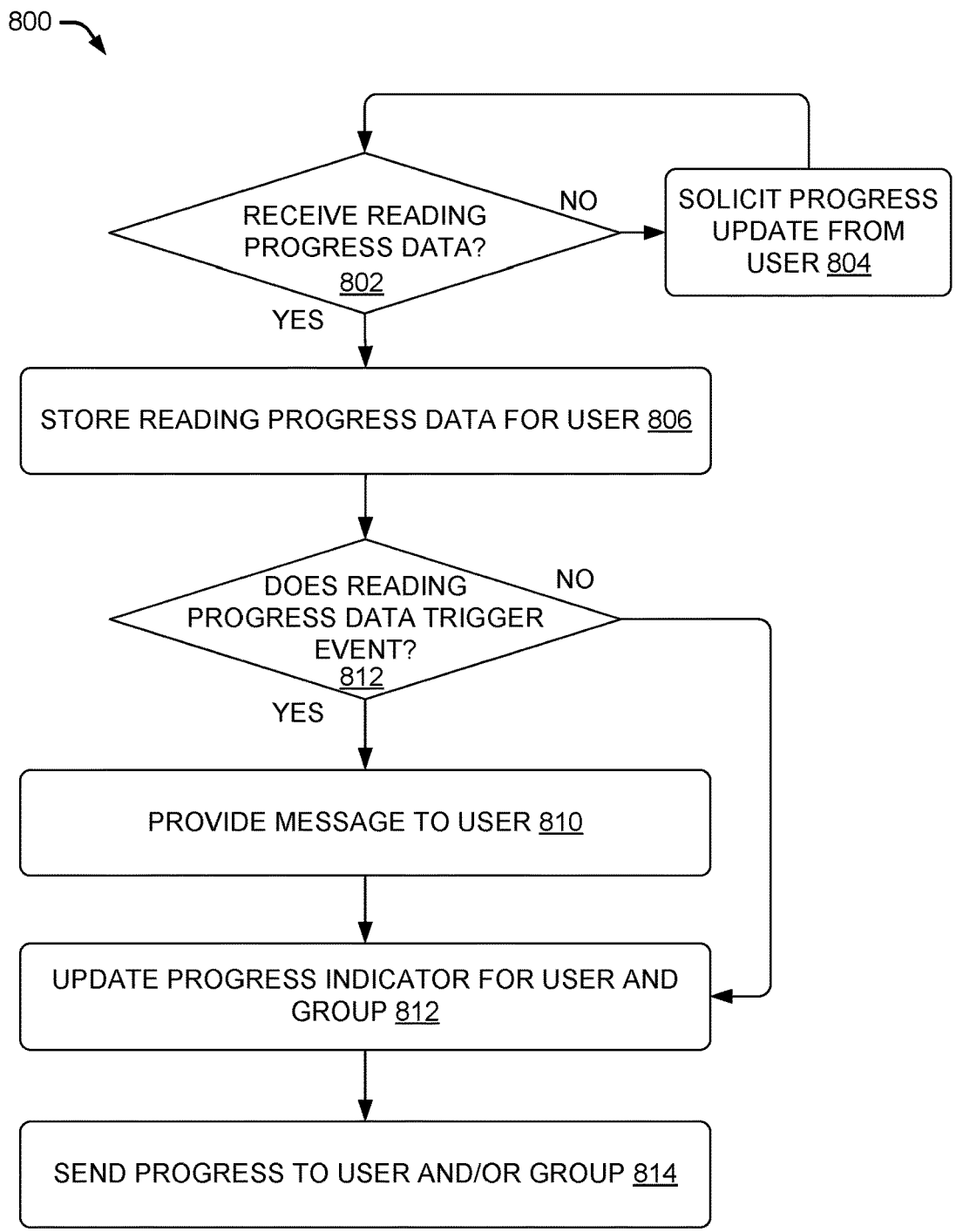
FIG. 8 is a flow diagram of an illustrative process to update reading progress of users.

FIG. 8 is a flow diagram of an illustrative process 800 to update reading progress of users. The process 800 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 800 is described with reference to the environment 100 and the computing architecture 200. Of course, the process 800 may be performed in other similar and/or different environments.

At 802, the progress tracker 124 may determine whether reading progress data has been received from a user device. For example, the progress tracker 124 may receive reading progress data from a dedicated reader device, via manual input by a user, via a text message or email, or by analyzing a photo provided by a user device where the photo include information identifying a location in the book. When no reading progress data is received from the user via a user device, or when no reading progress data is received within a predetermined amount of time (following a "no" route from the decision operation 802), then the process 800 may advance to an operation 804.

At 804, the messaging module 128 may solicit an update of the reading progress data from the user device. In some embodiments, the solicitation may be provided to a text message or email address, and an update of the reading progress data may be provided as a reply to the message. Following the operation 804, the process 800 may return to the decision operation 802.

When reading progress data is received from the user via a user device (following a "yes" route from the decision operation 802), then the process 800 may advance to an operation 806. At 806, the progress tracker 124 may store reading location data for the user.

At 808, the event module 208 may determine if the reading progress data triggers an event or message. For example, the determination at the decision operation 808 may be based on triggers created using the trigger control 718 discussed with reference to the UI 700 shown in FIG. 7. When the reading progress data triggers an event (following a "yes" route from the decision operation 808), then the process 800 may advance to an operation 810.

At 810, the messaging module 128 may provide a message corresponding to the event to the user via a user device and/or via the ad hoc forum. In some embodiments, the messaging module 128 may provide the message via a text message, an email, a dedicated reader device, and/or other communication channels. The messaging module 128 may obtain the message from the event module 208.

At 812, following the operation 810 or when the reading progress data does not trigger an event (following a "no" route from the decision operation 808), the progress tracker 124 may update the progress indicator for the user and/or for the group of readers. For example, the progress tracker 124 may store a new progress for the user, which may be used by the user interface module 126 when creating the reading progress graphic 614 shown in FIG. 6.

At 814, the reading progress graphic 614 may be updated by the user interface module 126. In some embodiments, the messaging module 128 may provide progress updates to users and/or to the group via communication channels other than the ad hoc forum. For example, the messaging module 128 may provide an email update of progress or may provide a text message to a user that is falling behind the group or falling behind a goal, for example. Other messages regarding progress may also be provided by the messaging module 128, such as positive reinforcement and/or accolades.

Figure 9:
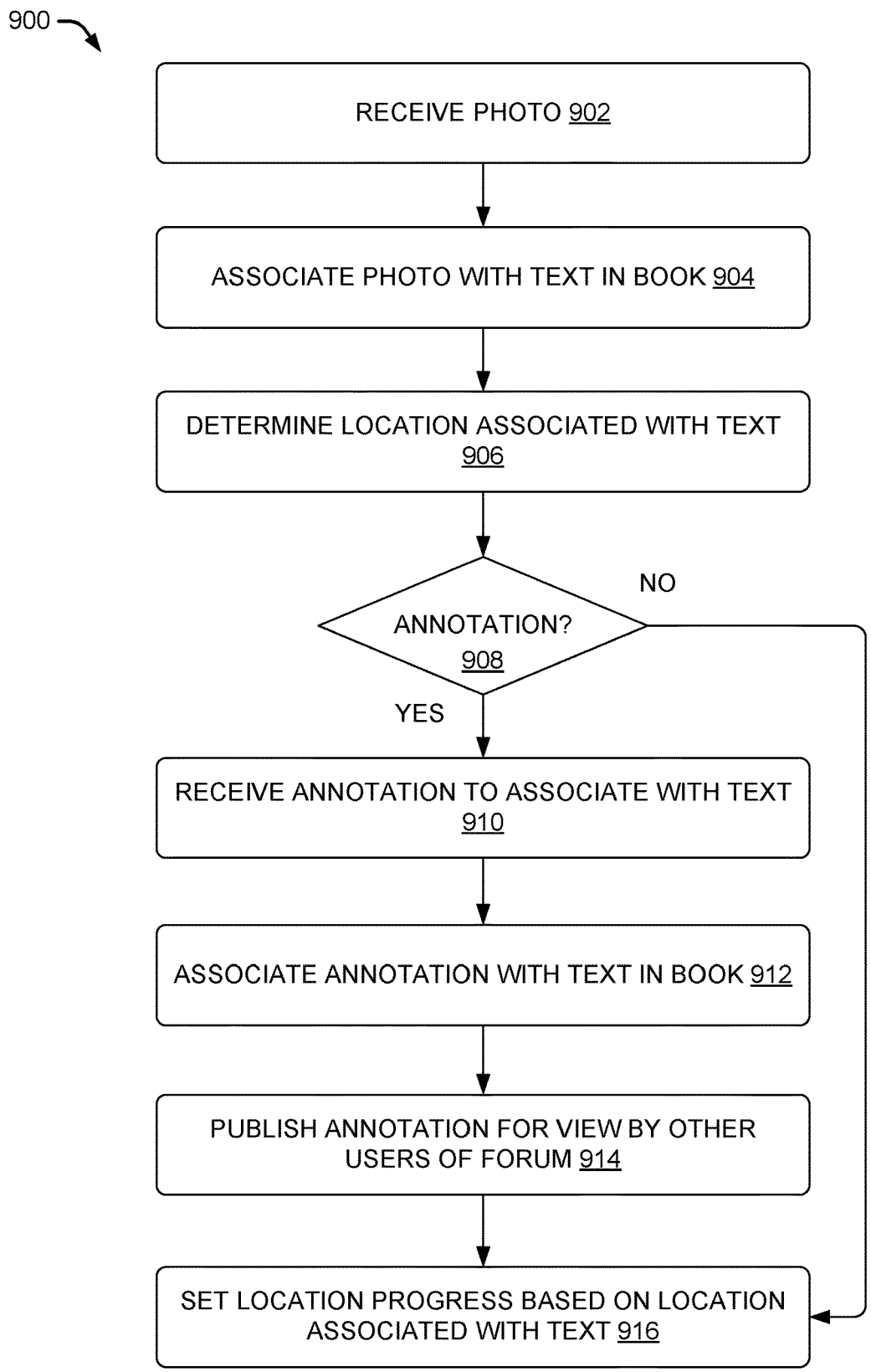
FIG. 9 is a flow diagram of an illustrative process to analyze photos to update information on an ad hoc forum for a co-reading group.

FIG. 9 is a flow diagram of an illustrative process 900 to analyze photos to update information on an ad hoc forum for a co-reading group. The process 900 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 900 is described with reference to the environment 100 and the computing architecture 200. Of course, the process 900 may be performed in other similar and/or different environments.

At 902, the application 204 may receive a photo submitted by a user of the ad hoc forum. For example, the user may create a digital photograph using a user device, such as a smart phone. The digital photograph may include imagery of a page of a physical book, which may depict text on the page and/or a page number or other location identifying information. The digital photograph (or simply "photo") may be transmitted by the user device to the service provider 102, possibly via the messaging module 128. For example, the photo may be sent by MMS or email.

At 904, the application 204 may associate at least some content in the photo with text in the book to enable determination of a reading location or page of the book. In some embodiments, the photo may include a page number or other information that definitively identifies a reading location. However, when this information is not included, the content in the photo may be used to determine a reading location, such as by matching words shown in the photo with words in a digital version of the book. Once matched, a location may be determined at 906. For example, the words shown in a photo may be converted to text using optical character recognition (OCR). The text may then be matched to a portion of text in a digital version of the book, which in turn may be associated with a reading location.

At 908, the application 204 may determine whether to provide an annotation with a location associated with the photo. For example, the photo may be used to determine a page or reading location for use by the progress tracker, and/or may be used to associate an annotation or other metadata with text in the book. The photo may be used to determine which text to use for association of metadata. When the photo is used to create an annotation (following a "yes" route from the decision operation 908), then the process 900 may advance to an operation 910.

At 910, the application 204 may receive text or another annotation in association with the photo or via the photo. For example, an email or an MIMS message may include a photo and text to be associated with the photo that is sent along with the photo. This text could be associated with a location of the text in the photo as an annotation. As another example, a user may highlight text in a physical book, and then capture a digital photo of the page with the highlighted text. OCR may determine the text and detect the highlight of the text or portion thereof. Thus, the photo may include both text for use to determine a location as well as the annotation itself.

At 912, the application 204 may associate the annotation with the text. In some embodiments, as described above, the application 204 may identify the annotation from the message that includes the photo, and possibly from the photo (e.g., a highlight or manipulation of the text in the photo).

At 914, the application 204 may publish the annotation for view by other users of the forum and/or users of dedicated reading devices. For example, the user interface module 126 may add the annotation as a new one of the annotation tick marks 630 plotted with respect to the graph 628 of the UI 600 shown in FIG. 6.

At 916, following the operation 914, or when the photo is not used to create an annotation (following a "no" route from the decision operation 908), the progress tracker 1243 may set a reading location to at least the location shown in the photo. In some embodiments, if the photo shows a location earlier in the book and a current reading location of the user, the progress tracker 124 may disregard this information and maintain the later reading progress location.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving a request to create a forum to facilitate collaboration among readers of a written work, the forum being accessible by a location identifier via at least one of a text input, a link, or a quick response (QR) code;
   creating, based at least in part on the request, the forum;
   sending the location identifier associated with the forum to a plurality of devices;

receiving, from a device of the plurality of devices, data relating to a page in the written work associated with a reading progress of a user associated with the device;

sending, to the device and in association with the location identifier, a group reading progress of two or more users including the user that is based at least in part on the reading progress; and publishing to the forum a reading progress goal associated with a graphical output of the group reading progress.

2. The method as recited in claim 1, wherein receiving the request further comprises:

receiving contact information for one or more invitees; and sending one or more invitations, individual ones of the one or more invitations being sent to corresponding invitees of the one or more invitees, the individual ones of the one or more invitations including an identification of the written work.

3. The method as recited in claim 1, wherein the location identifier includes at least one of a network address or a file location.

4. The method as recited in claim 1, further comprising:

accessing, via at least one of an email or a text message, annotation data created by the user associated with the device; and sending at least a portion of the annotation data to a second user via the forum.

5. A system comprising:

one or more processors; and memory storing one or more computer-readable instructions that, when executed, cause the one or more processors to perform acts comprising:

receiving a request to create a forum to facilitate collaboration among readers of a written work;

creating, based at least in part on the request, the forum;

sending a location identifier associated with the forum to a plurality of devices;

receiving, from a device of the plurality of devices, data relating to a page in the written work associated with a reading progress of a user associated with the device;

sending, to the device and in association with the location identifier, a group reading progress of two or more users including the user that is based at least in part on the reading progress; and publishing to the forum a reading progress goal associated with a graphical output of the group reading progress.

6. The system as recited in claim 5, wherein:

the forum is accessible by the location identifier including at least one of a network address or a file location; and the location identifier is accessible via a text input, a link, or a quick response (QR) code.

7. The system as recited in claim 5, wherein the acts further comprise:

causing, via a first portion of a user interface of the device, display of first information based at least in part on inputs by the user associated with the device;

causing, via a second portion of the user interface, display of second information pertaining to the group reading progress; and causing, via a third portion of the user interface, display of third information pertaining to messages shared between the two or more users.

8. The system as recited in claim 5, wherein the acts further comprise:

causing, via a user interface of the device, display of a message feed with at least one message by at least one user of the two or more users.

9. The system as recited in claim 5, wherein the request includes information identifying at least one of the written work, names of invitees to access the forum, or contact information for each invitee of the invitees.

10. The system as recited in claim 5, wherein the acts further comprise:

receiving an image from a user device associated with the user, the image depicting a page of a physical version of the written work; and analyzing text in the image using optical character recognition (OCR) to match at least a portion of the text to a digital version of the written work, and to determine a reading location associated with the user.

11. The system as recited in claim 5, wherein the acts further comprise:

receiving an image from a user device associated with the user, the image depicting a page of a physical version of the written work and at least one of a message or a user-created highlight;

analyzing text in the image using optical character recognition (OCR) to match at least a portion of the text to a digital version of the written work, and to identify a portion of the text associated with the message or the user-created highlight; and creating an annotation including metadata that includes at least one of the message or a highlight based at least in part on the user-created highlight.

12. The system as recited in claim 5, wherein the forum includes at least one of first information based at least in part on inputs by the user associated with the device, second information pertaining to the group reading progress, or third information pertaining to messages shared between the two or more users.

13. The system as recited in claim 5, wherein the acts further comprise:

receiving a trigger event associated with at least one of a page number of the written work, an end of a chapter of the written work, a date, or a time and date; and outputting, via the forum and based at least in part on an occurrence of the trigger event, a message associated with the trigger event.

14. The system as recited in claim 5, wherein the acts further comprise:

associating a comment submitted by the user with a reading location associated with the user; and outputting, via the forum, the comment to a second user having a second reading location that is greater than the reading location associated with the user.

15. The system as recited in claim 5, wherein the acts further comprise:

associating a comment submitted by the user with a reading location associated with the user; and refraining from outputting, via the forum, the comment to a second user having a second reading location that is less than the reading location.

16. A method comprising:

receiving a request to create a forum to facilitate collaboration among readers of a written work;

creating, based at least in part on the request, the forum;

sending a location identifier associated with the forum to a plurality of devices;

receiving, from a device of the plurality of devices, data relating to a page in the written work associated with a reading progress of a user associated with the device;

publishing, to the forum, a group reading progress of two or more users including the user that is based at least in part on the reading progress; and sending, to the device and in association with the location identifier, the group reading progress.

17. The method as recited in claim 16, further comprising:

outputting a message via the forum in response to a trigger event, the trigger event being associated with at least one of a page number of the written work, an end of a chapter of the written work, a date, or a time and date.

18. The method as recited in claim 16, wherein:

the forum is accessible by the location identifier including at least one of a network address or a file location; and the location identifier is accessible via a text input, a link, or a quick response (QR) code.

19. The method as recited in claim 16, wherein the forum includes at least one of first information based at least in part on inputs by the user associated with the device, second information pertaining to the group reading progress, or third information pertaining to messages shared between the two or more users.

20. The method as recited in claim 16, further comprising:

associating a comment with a reading location of the user; and refraining from outputting, via the forum, the comment to a second user that has a second reading location that is less than the reading location.

\* \* \* \* \*